RICHARD H. BAUER
RICHARD KILPERT Inventors

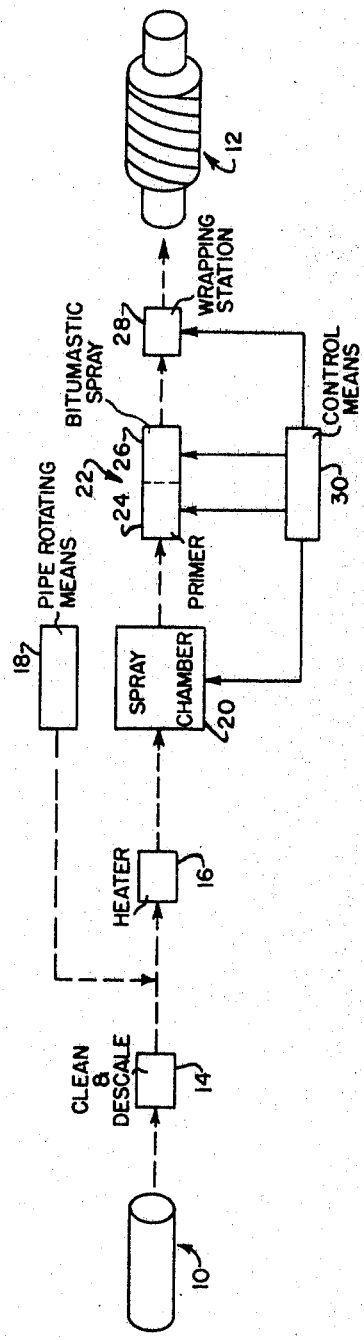
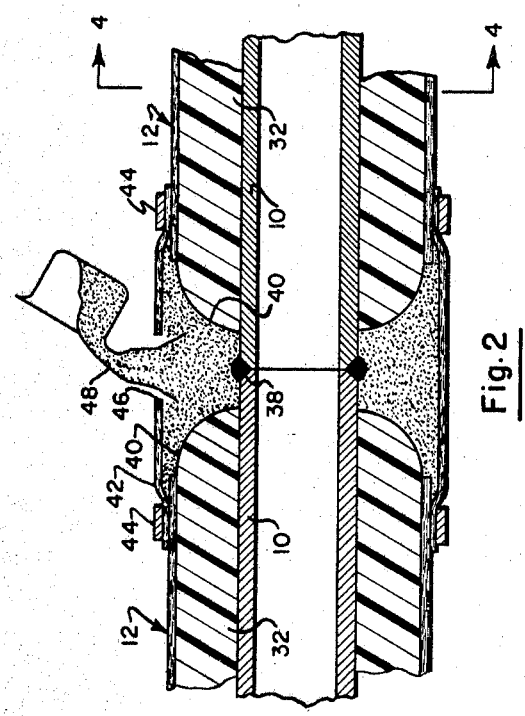

By Donald F. Wohlers
Attorney

United States Patent Office 3,480,493
Patented Nov. 25, 1969

3,480,493
METHOD AND APPARATUS FOR SPRAY FOAM INSULATING A PIPE
Richard H. Bauer, West Caldwell, and Richard Kilpert, Berkeley Heights, N.J., assignors to Esso Research and Engineering Company, a corporation of Delaware
Continuation-in-part of application Ser. No. 420,083, Dec. 21, 1964. This application Aug. 27, 1965, Ser. No. 486,591
Int. Cl. B32b 5/18, 31/14; B65h 81/06
U.S. Cl. 156—78                    10 Claims

ABSTRACT OF THE DISCLOSURE

A method and apparatus for applying a sprayed plastic foam insulation to a pipe wherein the pipe is cleaned and preheated to at least 90° F. prior to spray application of foam. The cleaning and preheating assist in the foaming process and enhances the physical bond of the initial layer of sprayed foam to the pipe. A subsequent bitumastic and kraft paper vapor-barrier is subsequently applied to the exterior surface of the insulation.

---

This application is a continuation-in-part of applicants' prior co-pending application Ser. No. 420,083 filed Dec. 21, 1964 and now abandoned.

This invention relates to insulated pipes or conduits in general and in particular to improved methods and apparatus for making and joining sections of insulated pipe which employ as insulation one of the many commercially available plastic foam materials such as polyurethane.

While it has been suggested that a pipe may be provided with a high efficiency insulation cover by the application of a pre-molded polyurethane foam material thereabout, such technique is comparatively costly. The present invention is specifically directed toward an improved and more economical method of providing insulation of this type to a pipe. To this end, a novel process has been developed for the spray application of a foamable insulation material to the surface of the pipe as the pipe is advanced and rotated past the spraying nozzle. Preferably the non-insulated pipe is heated in advance of the spray application of the foamable insulation, which heat serves to accelerate and complete the foaming process occurring upon the deposition of the sprayed foamable mixture upon the pipe. Thereafter in the novel method of the invention, the pipe so insulated is continued to be advanced and rotated while a subsequent water and vapor barrier in the form of a mastic or other type coating and paper wrapping is applied.

In the spray application of insulation in accordance with the invention to a single pipe length, suitable means are provided to sense the leading and trailing ends of the pipe so that the application of the insulation thereto is automatically omitted in the areas adjacent the pipe ends. The invention also provides for the sequential spray coating of pipes with insulation, and for this purpose employs a novel means for temporarily coupling the ends of adjacent pipe sections. After the insulation of each pipe section, a subsequent two-stage application of bituminous mastic is applied by spraying while the insulation is still in a slightly tacky state. It has been found that the early application of the mastic coating at this stage produces a thicker surface skin formation on the insulation thereby increasing its durability and resistance to moisture absorption and the bond between the insulation and mastic. Another aspect of the present invention concerns a novel process for insulating the noninsulated end joint between two insulated conduits after they have been joined in abutting fashion.

Accordingly, it is the principal object of the invention to provide an improved method of applying insulation to a conduit.

Another object of the invention is to provide an insulated conduit which has improved thermal efficiency along its length as well as in the area adjacent the pipe joints.

Another object of the invention is to provide an improved foamed pipe insulation having a thickened surface skin.

Another object of the invention is to provide a novel method for insulating the welded end joint between adjacent sections of insulated pipes.

Another object of the invention is to provide an improved coupling means for temporarily securing a plurality of pipe sections in end-to-end relationship.

These and other objects and advantages of the invention will become apparent and the invention will be fully understood from the following description and drawings in which:

FIG. 1 is a schematic flow diagram of the various steps of the invention;

FIG. 2 is a cross-sectional view showing the manner in which the pipe joint is insulated in accordance with another aspect of the invention;

Figure 3:
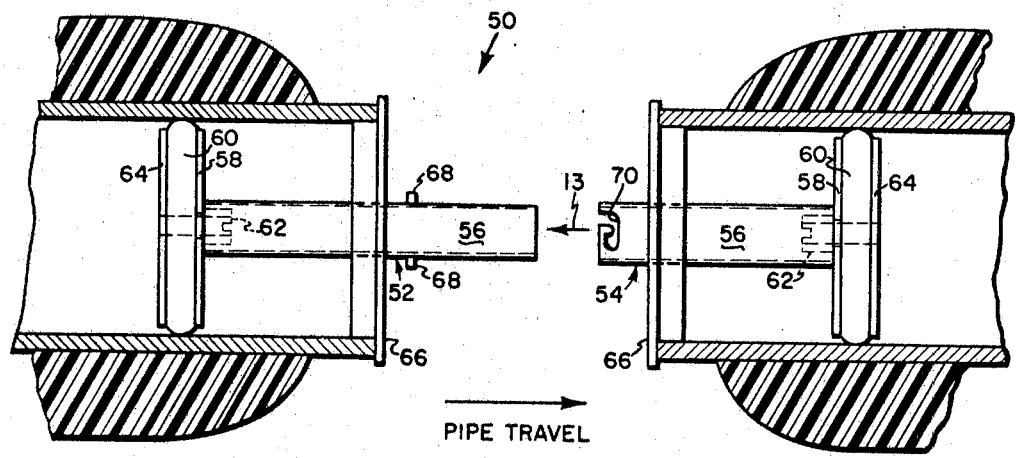
FIG. 3 is a cross-sectional view of adjacent pipe ends as they would be temporarily coupled during the insulation coating process.

It will be understood that the drawings illustrate merely a preferred embodiment of the invention and that other embodiments are contemplated within the scope of the claims as set forth.

Referring to FIG. 1 in particular, an uninsulated pipe 10 is advanced by conveyor means (not shown) in the direction of the dotted arrows through a cleaning and descaling station 14. After the temperature of the cleaned, advancing pipe 10 is increased by a heater 16, it enters a chamber 20 for the spray application of a foamable insulation material such as polyurethane. While for the purposes of convenience the invention has been described in connection with the spray application of a polyurethane foam, the invention is novel irrespective of the specific type of foam insulation applied. Obviously, insulation such as foamed glass, foamed polystyrene or others could be employed without departing from the spirit of the invention. Those skilled in the art will readily appreciate that chamber 20 may include any suitable means for spraying and mixing a two-part foamable plastic wherein the foaming reaction starts within a relatively few seconds after foamable components are mixed and sprayed. Prior to passage of the pipe 10 through the heater 16 and spraying chamber 20, a pipe rotating means 18 is effective to impart a rotational and lateral movement to the pipe as it is advanced throughout the remainder of the processing steps. In this way the buildup of insulation material upon the pipe's exterior in the chamber 20 is uniformly distributed and progressively applied to the pipe periphery. In one form of the invention, the pipe is rotated at 20 r.p.m. and the width of the area being sprayed is sufficiently wide relative to the speed of the lateral advance of the pipe so that any one point on the pipe surface is exposed to four passages through the spray area. If a two inch thickness of foamed insulation is desired, a spray density sufficient to deposit a one-half inch thickness of insulation for each revolution thereof would be selected. In one form of the invention, a butane-fired ring-shaped heater has been employed. However, passage of steam within the pipe interior has been employed to equal advantage to raise the surface temperature of the pipe to 90° to 120° F., a preferred temperature for completion of the polyurethane foaming process. If service conditions warrant, a preliminary corrosion protective coating may be applied prior to the application of the foam insulation. Such a coating might be desirable when low temperature fluids are conveyed in the pipeline and the likelihood of moisture condensation is great or to guard against any unanticipated puncture of the exterior vapor barrier that may occur during installation or service.

Thereafter as the pipe section 10 continues to advance, it is processed by a water and vapor barrier application means indicated generally at 22. The means 22 includes a primer spray section 24 and a bitumastic spray section 26. A minimum of time is allowed to elapse between the pipe's passage from the end of the spray foam chamber 20 and the first application of mastic primer spray at section 24. It has been found that it is preferable to apply the spray 24 while the exterior of the insulation is still in a slightly tacky or semi-cured state which has the beneficial effect of increasing the thickness of the surface skin. In this way, the insulation is made more durable and resistant to moisture absorption. The consistency of the primer spray 24 is also preferably chosen to be more fluid than the spray applied at station 26 so that small voids in the insulation surface are completely sealed and the exterior surface smoothed for the subsequently applied heavier bitumastic coating. A wrapping station indicated at 28 is effective to apply a further vapor barrier layer to the still tacky bitumastic applied at the preceding station 26. The vapor barrier applied at station 28 is preferably a spirally wrapped kraft paper. It will be understood that for the purpose of the invention many different types of water and vapor barrier materials may be employed and they need not necessarily be applied in this specific fashion.

In FIG. 1, the insulated pipe section is shown in its completed form as element 12. Operating in conjunction with the means 20, 22 and 28 is a control means shown schematicaly at 30 which is effective to start and stop the application of insulation, primer spray, bitumastic spray, and wrapping paper at the appropriate points adjacent the ends of each pipe section. It will be understood that the control means 30 includes suitable sensing means which may be mechanical, optical or electrical for determining the position of the ends of each pipe section so that insulation is not unnecessarily applied to the area of the pipe which will be subsequently welded. While an excess of insulation could be applied to the pipe ends and be subsequently removed in the area of the weld, such removal would operate to rupture the closed cell structure of the insulation in its sprayed form in this area and would therefore increase the possibility of water penetrating the insulation.

Figure 4:
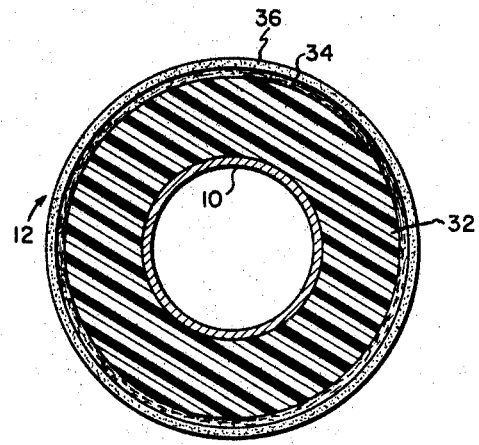
FIG. 4 is a cross-sectional view of an insulated pipe in accordance with the invention taken along line 4—4 of FIG. 2.

Referring to FIG. 4, the insulated pipe in cross-section is illustrated. The expanded foam insulation 32 is of approximately two inch thickness as previously related. The primer and water/vapor barrier coating applied by means 24 and 26 is indicated at 34. The paper applied at wrapping station 28 is indicated at 36.

In FIG. 2, a pair of adjacent pipe sections 10—10 are shown welded at 38. It should be noted that the ends of the sprayed insulation layers 32 terminate in rounded end portions 40 at a short distance displaced from the pipe end. In insulating the welded pipe joint, a sheet of substantially rigid material 42, such as galvanized iron, is wrapped in a cylindrical form about the outside diameter of the pipe insulation and secured thereto by a pair of metal straps 44. The cylindrical sheet 42 includes at least one aperture 46 through which sufficient foamable polyurethane material 48 is poured or otherwise introduced so that the entire interior void area of the joint is filled. After the liquid polyurethane 48 has foamed and set within the interior void, the aperture 46, cylindrical sheet 42, and the ends of the sheet 42 may be coated with a suitable mastic material (not shown) to insure a water/vapor barrier across this joint area. It will be seen that the pipe joint now includes a continuous insulation cover of substantially the same thickness as the body portion of the adjacent pipe. The galvanized sheet 42 may be left in the position shown so that a complete moisture barrier is present along the entire length of the pipe sections. Alternatively, the sheet 42 may be removed and a conventional vapor barrier applied. Should this latter procedure be used, it is desirable to apply a nonadhering type coating to the inside surface of sheet 42 to prevent rupture of the closed cell structure of the foam and allow reuse of the sheet without a cleaning step.

Referring to FIG. 3, the coupling that may be employed for joining adjacent pipe sections 10—10 during their passage through the steps illustrated in FIG. 1 is shown. The coupling body, generally indicated at 50, includes a male half 52 and a female half 54. Each half includes many similar elements which have been designated with like numerals. Each half includes an elongated hollow tube 56 which carries circular plate 58 secured to an end thereof. A resilient ring member 60 is disposed adjacent the plate 58 and held in contact therewith by a compression plate 64. A threaded bolt 62 disposed at the bottom end of the tube 56 passes through a clearance aperture in plate 58 and threadably engages the central portion of plate 64. A shield member 66 is secured to a central portion of each of the tubes 56. The shield 66 stabilizes the outer ends of each coupling half and prevents entry of foreign matter into the pipe end. One of the tubes 56 has an outside diameter slightly smaller than the inside diameter of the adjacent tube 56 so that it may be inserted therein. One tube is provided with a pair of projecting studs 68 which engage and lock into a conventional type bayonet slot 70 in the other tube. In use, each half of the coupling 50 is inserted into the respective ends of the pipe sections to be joined and the bolts 62 are tightened by a suitable tool (not shown) inserted into the interior of the tube 56. Tightening of the bolts 62 accomplishes the axial displacement of the compression plates 64 toward the plates 58 to expand the outside diameter of rings 60 to engage the pipe inside diameter. With each half of the coupling 50 thus secured to its respective pipe end, the pipe sections may be made fast by a small axial movement and angular rotation of one with respect to the other to lock the studs 68 with the slot 70. In this way the novel coupling of the invention provides for the easy and quick joining of the pipe sections prior to advance through the insulating steps of FIG. 1. After the insulation process has been completed, each of the couplings may be quickly disassembled to permit stocking of the individual pipe sections and re-used indefinitely.

While a specific embodiment of the invention has been shown and described in detail to illustrate the application of the inventive principles, it will be understood that the invention may be embodied otherwise without departing from such principles.

What is claimed is:

1. The method of applying a plastic foam insulation to a pipe comprising the steps of conveying the pipe along an extended path, cleaning the exterior surface of said pipe as it is conveyed in said path, mixing and sequentially spraying a plurality of layers of constituents of a foamable plastic insulation onto the exterior surface of said pipe, heating said pipe to at least 90° F. prior to the aforesaid spraying of plastic insulation to assist the foaming process of the initial layer of plastic insulation after it is sprayed upon the pipe exterior and to enhance the bond of the initial layer to said pipe, and applying a water-vapor barrier to the exterior surface of the foamed plastic insulation.

2. The method of claim 1 wherein said last mentioned step includes applying a bitumastic first barrier prior to the completion of the insulation foaming process to thereby inhibit further foaming and form a thickened surface skin of plastic insulation and applying a spirally wrapped paper second water-vapor barrier exterior of said first barrier.

3. The method of claim 2 including the further step of rotating said pipe about its lengthwise axis during the steps of spraying said insulation and applying said water-vapor barrier.

4. The method of claim 3 including the further steps of coupling a plurality of pipe sections in end-to-end relationship, and controlling the spraying of said foamable plastic so as to interrupt the application of insulation adjacent the ends of the individual pipe sections.

5. The method of thermally insulating an elongated conduit with a foamable insulation material comprising the steps of advancing the conduit along its longitudinal axis, rotating the conduit about said axis as it is advanced, sensing the approach of the ends of the conduit, heating the conduit to at least 90° F. to assist in the foaming process of said foamable plastic insulation and to improve the bond thereof to said conduit, spraying a foamable plastic upon the conduit to progressively build up the desired thickness of insulation, and controlling said spraying of insulation material in response to said sensing of the condiut to discontinue the application of insulation material adjacent the conduit ends.

6. The method of claim 5 including the further steps of applying a first water-vapor barrier of adhesive material to the foamed plastic insulation and subsequently applying a spirally wrapped second water-vapor barrier to said adhesive material first barrier prior to its setting to secure said second barrier to said first barrier.

7. The method of claim 6 including the further step of rotating said conduit at least during the spraying and water-vapor barrier application steps.

8. Apparatus for applying a plastic foam insulation to a pipe comprising means for conveying the pipe along an extended path, means for cleaning the exterior surface of said pipe as it is conveyed in said path, means for heating said pipe to at least 90° F., means for mixing and spraying the constituents of a foamable plastic insulation onto the exterior surface of said pipe, and means for applying a water-vapor barrier to the exterior surface of the foamed plastic insulation.

9. The apparatus of claim 8 wherein said last mentioned means includes means for applying a bitumastic first barrier prior to the completion of the insulation foaming process to thereby form a thickened surface skin of plastic insulation and applying a spirally wrapped paper second barrier exterior of said first barrier.

10. The apparatus of claim 9 including means for rotating said pipe about its lengthwise axis during the spraying of said insulation and applying said water-vapor barrier.

References Cited

UNITED STATES PATENTS

| 1,988,628 | 1/1935 | McDonald et al. | 138—149 XR |
| 2,857,931 | 8/1958 | Lawton | 138—149 XR |
| 2,863,204 | 12/1958 | Timothy et al. | 25—38 XR |
| 3,009,209 | 11/1961 | Weinbrenner et al | 264—310 XR |
| 3,041,700 | 7/1962 | Smith | 25—38 |
| 3,307,590 | 3/1967 | Carlson | 138—149 |
| 3,316,587 | 5/1967 | Scruggs | 264—310 XR |

HAROLD ANSHER, Primary Examiner

G. W. MOXON II, Assistant Examiner

U.S. Cl. X.R.

156—192, 278, 357, 429